June 19, 1956  A. E. WEINGARD  2,750,799

GAS METER DIAPHRAGM AND MOUNTING

Filed March 22, 1954

INVENTOR
Archie E. Weingard
BY Ralph Hammar
ATTORNEY

United States Patent Office 2,750,799
Patented June 19, 1956

2,750,799

GAS METER DIAPHRAGM AND MOUNTING

Archie E. Weingard, Erie, Pa., assignor to American Meter Company, Incorporated, Erie, Pa., a corporation of Delaware Application March 22, 1954, Serial No. 417,874

1 Claim. (Cl. 73—278)

This invention is intended to improve the bellows diaphragms used in the measuring chambers of gas meters. Bellows diaphragms must be limp and flexible so that they will offer a minimum of resistance to movement and therefore not impose excessive load on the meter and also must be sufficiently rigid to retain their shape while subject to a pressure which must be supported without collapse. Bellows diaphragms must always displace the same volume in their movement from the collapsed to the expanded positions and therefore it is essential that the shape of the bellows at the two extremes be precisely reproduced at each stroke. Also it is desirable that the bellows diaphragms be capable of a large stroke to increase the volume of gas measured at each stroke. These contradictory requirements of flexibility or limpness and shape retention are fulfilled by a bellows type diaphragm having three convolutions with the two convolutions at the end of the diaphragm narrower and of smaller diameter than the one at the center. With this construction, the flexibility is secured by flexure or hinging of the sides of convolutions about the roots and crests of the convolutions while the stiffness to secure shape retention is derived from the roots and crests of the convolutions.

Figure 1:
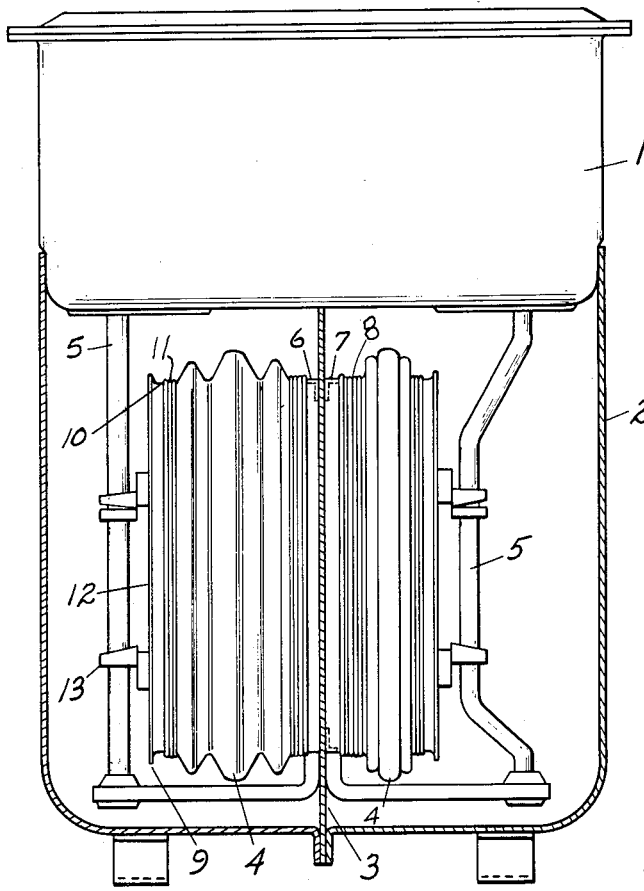
Figure 2:
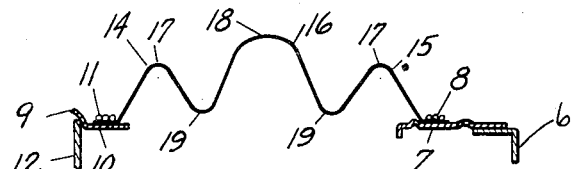
Figure 3:
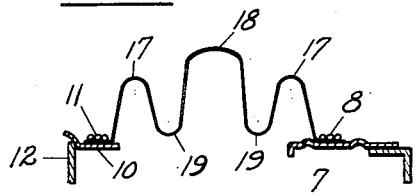
Figure 4:
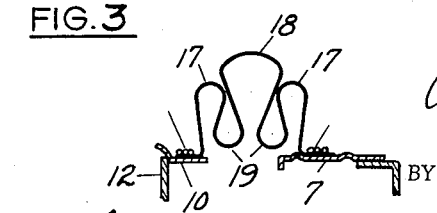

In the accompanying drawing, Fig. 1 is a diagrammatic side elevation of a gas meter partly in section to illustrate the operation of the gas meter diaphragms, and Figs. 2, 3, and 4 are fragmentary sections through one of the gas meter diaphragms showing the action of the diaphragms in going from the expanded to the collapsed position.

In gas meter, the measurement of gas is effected by conducting the gas from an inlet to one or more expansible measuring chambers and then expelling the gas from the chambers to an outlet. Each time one of the gas measuring chambers is expanded and collapsed a definite quantity of gas is discharged to the outlet and by counting the number of times the chambers are expanded and collapsed the meter registers the amount of gas flowing through the meter. This is the mode of operation of the common diaphragm or bellows type gas meter in general use.

For best operation it is desirable that the bellows diaphragms forming the measuring chambers be of limp material and that the resistance to expansive and collapsing movement of the diaphragm be small and subject to a minimum of change in the various positions of the diaphragm. It is also desirable that the diaphragm be so constructed as to avoid stress concentration which might result in local failure. These requirements have in the past been met by making the diaphragm of leather and of fabric reinforced synthetic elastomers. In all diaphragms it is desirable that the movement of the diaphragm be as large as possible so as to increase the capacity of the meter.

In Fig. 1 of the drawing there is diagrammatically shown a gas meter having a gas distributing chamber 1 on top of a lower case 2 containing four gas measuring chambers. This is a common type of meter and it is unnecessary for the purpose of the present invention to illustrate the valves in the gas distributing chamber by which the gas is conducted to the measuring chambers nor the connections to the inlet and outlet lines nor the connections to the register. These parts are well understood and are available in a wide variety of forms. As is customary in this type of gas meter the lower case 2 is divided into two equal parts by a center partition 3 and diaphragms 4 are arranged on opposite sides of the center partition thereby forming two measuring chambers on each side of the partition, one of the chambers being on the inside of each of the bellows 4 and the other of the chambers being on the outside. The expansive and collapsing movements of the bellows are transmitted to the gas distributing chamber 1 by the usual flag rods 5. The diaphragms 4 are suported on the center partition 3 by cylindrical rings 6 fixed to the partition and having flanges 7 to which the adjacent end of the diaphragm is suitably cemented and fastened by binding wires 8. The end of the diaphragms adjacent the flag rods 5 are supported by cylindrical rings 9 having flanges 10 to which the diaphragm is cemented and secured by binding wires 11. The ends of the cylindrical rings 9 are closed by disks 12 to which are fixed brackets 13 connected to the flag rods 5. By this arrangement the ends of the bellows diaphragms 4 are closed by rigid end walls and there is provision for relative movement of these rigid end walls toward and away from each other so as to collapse and expand the bellows to effect the gas measurement.

In order to increase the measuring capacity of the gas meter the diaphragms 4 are provided with at least three convolutions, there being convolutions 14 and 15 adjacent the ends of the diaphragm and an intermediate convolution 16. The diaphragms are made of limp material so as to offer a minimum of resistance to the necessary expansion and contraction during gas measuring and conveniently can be made from a suitable bias cut fabric such as parachute nylon impregnated with one of the synthetic elastomers such as Buna N. In the manufacture of the bellows, the fabric impregnated with the elastomer is placed in a mold and molded under curing conditions to the desired final shape. Because of the limp nature of the diaphragm it is important that the convolutions be shaped so as to obtain uniform flexing as the diaphragm moves between the expanded and collapsed positions. It is also desirable that the convolutions be shaped so as to provide radial stability for the diaphragms. These two objectives are attained in the diaphragm construction illustrated in detail in Figs. 2, 3 and 4. From these figures, it can be seen that the crests 17 of the convolutions 14 and 15 adjacent the rigid end walls of the diaphragm are substantially narrower than the crests 18 of the intermediate convolution 16. Also the roots 19 between the convolutions 14 and 15 are of larger diameter than the ends of the diaphragm secured to the cylindrical flanges 7 and 10. With this construction, there is substantially no deflection either of the crests 17 and 18 or of the roots 19 but the deflection is almost entirely confined to the side walls of the convolutions. This is clearly apparent by comparing Figs. 2, 3 and 4 which illustrate the successive positions of the diaphragm. The greater width of the crests 18 of the intermediate convolutions 16 provides the additional radial stability needed for the center section of the diaphragm which cannot derive support from the rigid end flanges 7 and 10. The greater diameter of the crests 18 permits the nesting of the crests 17 of the end convolutions 14 and 15 in the fully collapsed position of the diaphragm illustrated in Fig. 4. Having the roots 19 of larger diameter than the ends of the diaphragm keeps the roots of the diaphragm clear of the cylindrical flanges 7 and 10 so there will be no pinching in the fully collapsed position of the diaphragm. With this diaphragm construction the flexing is very uniform without any local stress concentration which might cause local fatigue failure.

What is claimed as new is:

In a gas meter, means forming a gas measuring chamber including a bellows shaped diaphragm of molded bias cut fabric impregnated with an elastomer with ends closed by rigid end walls supported for relative movement toward and away from each other to collapse and expand the bellows, said end walls having cylindrical portions which approach each other in the collapsed position of the bellows, said bellows being molded to a shape having at least three axially spaced convolutions with the crests of the convolutions adjacent the end walls of smaller diameter and narrower width than other of the convolutions and with the roots of the convolutions between the end walls of greater diameter than the cylindrical portions of the end walls, means including a flag rod for controlling the stroke of the bellows from a collapsed position in which the roots and crests of the convolutions are adjacent each other to an expanded position in which the roots and crests of the convolutions are separated from each other, the length of the stroke being substantially less than the sum of the radial depths of the side walls of the convolutions and the side walls of the convolutions converging from the crests in the collapsed position and diverging from the crests in the expanded position whereby the side walls of the convolutions hinge about the roots and crests of the convolutions as the diaphragm is moved axially between expanded and collapsed positions without substantial deflection of the roots and crests of the convolutions.

References Cited in the file of this patent

UNITED STATES PATENTS

| | | |
|---|---|---|
| 723,888 | Loeben | Mar. 31, 1903 |
| 1,642,899 | Simpson | Sept. 20, 1927 |
| 2,430,081 | Roberts et al. | Nov. 4, 1947 |

FOREIGN PATENTS

| | | |
|---|---|---|
| 2,001 | Great Britain | 1880 |
| 101,286 | Australia | June 24, 1937 |